United States Patent [19]

Tsai

[11] Patent Number: 5,781,430
[45] Date of Patent: Jul. 14, 1998

[54] OPTIMIZATION METHOD AND SYSTEM HAVING MULTIPLE INPUTS AND MULTIPLE OUTPUT-RESPONSES

[75] Inventor: Roger Yen-Luen Tsai. Croton-on-Hudson. N.Y.

[73] Assignee: International Business Machines Corporation. Armonk. N.Y.

[21] Appl. No.: 671,286

[22] Filed: Jun. 27, 1996

[51] Int. Cl.$^6$ .................................................. G05B 13/04
[52] U.S. Cl. ........................... 364/148; 364/149; 364/153
[58] Field of Search ........................... 364/148, 149–151, 364/152–156, 157, 158

[56] References Cited

U.S. PATENT DOCUMENTS 5,353,229  10/1994  Tanaka ................................. 364/153
5,457,625  10/1995  Lim et al. ........................... 364/153 X
5,587,897  12/1996  Iida ..................................... 364/153 X

OTHER PUBLICATIONS

Robert K. Brayton. et al. A Survey of Optimization Techniques for Integrated–Circuit Design. Proceedings of the IEEE. vol. 69. No. 10. Oct. 1981. pp. 1334–1362.

*Primary Examiner*—Joseph Ruggiero
*Attorney, Agent, or Firm*—Stephen C. Kaufman. Esq.; IBM Corporation

[57] ABSTRACT

A method and system for optimizing a steady-state performance of a process having multiple inputs and multiple output-responses is provided. The method and system provide a unified and systematic way of optimizing nominal, statistical and multi-criteria performance of the process. The process can be inter alia a semiconductor manufacturing process or a business process.

7 Claims, 15 Drawing Sheets

FIG. 10

| | NAME | ABBREV. | MAX | MIN | MIN*1 | NUMBER OF LEVELS LEVEL SETTINGS | UNIT |
|---|---|---|---|---|---|---|---|
| 1 | HF1 CONCENTRATION | HFc1 | .025 | 0.005 | 0. | 4 (0.005 0.01 0.025) | HF/H2O RATIO |
| 2 | SC-1 H2O2 | AHO | 1.0 | 0.05 | 0. | 6 (0.05 0.1 0.4² 0.5 1) | RELATIVE TO 8 PARTS H2O |
| 3 | SC-1 NH3 | ANH | 1.0 | 0.05 | 0. | 6 (0.05 0.1 0.4² .5 1) | RELATIVE TO 8 PARTS H2O |
| 4 | SC-1 TEMPERATURE | AT | 66.0 | 25.0 | 0. | 5 (25 35 45 57 66) | DEGREES C |
| 5 | SC-1 TIME | At | 20.0 | 2.0 | 0. | 7 (1 2 3 5 7 10 20) | MINUTES |
| 6 | SC-1 MEGASONICS | AMA | 1.0 | 0.0 | 0. | 2 (UNIFORM) | 1-ON, 0-OFF |
| 7 | HF2 CONCENTRATION | HFc2 | .025 | 0.005 | 0. | 4 (0.005 .010 .025) | HF/H2O RATIO |
| 8 | SC-2 H2O2 | BHO | 1.0 | 0.05 | 0. | 6 (0.05 0.1 0.4² 0.5 1) | RELATIVE TO 8 PARTS H2O |
| 9 | SC-2 HCl | BHCL | 1.0 | 0.05 | 0. | 6 (0.05 0.1 0.4² 0.5 1) | RELATIVE TO 8 PARTS H2O |
| 10 | SC-2 TEMPERATURE | BT | 66.00 | 25.0 | 0. | 5 (25 35 45 57 66) | DEGREES C |
| 11 | SC-2 TIME | Bt | 20.0 | 2.0 | 0. | 7 (1 2 3 5 7 10 20) | MINUTES |
| 12 | SC-2 MEGASONICS | BMA | 1.0 | 0.0 | 0. | 2 (UNIFORM) | 1-ON, 0-OFF |
| 13 | FINAL RINSE TIME | BRt | 20. | 2. | 0. | 7 (1 2 3 5 7 10 20) | MINUTES |
| 14 | FINAL RINSE MEGASONICS | BRM | 1. | 0. | 0. | 2 (UNIFORM) | 1-ON, 0-OFF |

| | TEST WAFER | RESPONSES | MEASUREMENT TOOL |
|---|---|---|---|
| 1 | NITRIDE PARTICLES | % REMOVED (>0.26 μm) | TENCOR 5500 |
| 2 | OXIDE PARTICLES | % REMOVED (>0.26 μm) | TENCOR 5500 |
| 3 | IRON | $\times 10^{10}$ ATOMS/cm$^2$ REMAINING ON SURFACE | TXRF |
| 4 | COPPER | $\times 10^{10}$ ATOMS/cm$^2$ REMAINING ON SURFACE | TXRF |
| 5 | NICKEL | $\times 10^{10}$ ATOMS/cm$^2$ REMAINING ON SURFACE | TXRF |
| 6 | CZ WAFER | RMS SURFACE ROUGHNESS (Å) | AFM |
| 7 | CZ CLEAN WAFER | LPDs (% REMOVED 0.12-0.16 mm) | TENCOR 6200 |
| 8 | ST CLEAN WAFER | LPDs (% REMOVED 0.10-0.40 mm) | TENCOR 6200 |
| 9 | CZ CLEAN WAFER | PARTICLES ADDED 0.26 μm | TENCOR 5500 |
| 10 | HMDS | % REMOVED RELATIVE TO 1 MONOLAYER | ToF SIMS, OSEE, CONTACT ANGLE |

FIG. 12

| 40 | |
|---|---|
| 1. | RUN 1 MUST BE THE 8:1:1 POR |
| 2. | RUNS 2,3 ARE FOR HF ONLY: ONE OF THE RUNS WILL HAVE SC-2 RINSE MEGASONIC ON, AND THE OTHER MEGASONIC OFF |
| 3. | RUNS 4,5 ARE FOR SC-1 LAST: ONE OF THE RUNS WILL HAVE HF FIRST (WHEN SC-2 IS OFF, ALL CONCENTRATIONS ARE 0 BUT T IS 25°C AND TIME IS 1 MINUTE) |
| 4. | RUNS 6,7 ARE FOR SC-2 ONLY (W/O SC-1): ONE OF THE RUNS WILL HAVE HF FIRST (WHEN SC-1 IS OFF, ALL CONCENTRATIONS ARE 0 BUT T IS 25°C AND TIME IS 1 MINUTE) |
| 5. | FOR SC-1, WHENEVER NH4OH IS GREATER THAN HALF OF MAXIMUM, THE PROCESS TIME MUST BE LESS THAN ITS CURRENT POR, OR 5 MINUTES |
| 6. | FOR SC-2, WHENEVER HCl IS GREATER THAN HALF OF MAXIMUM, TIME MUST BE LESS THAN ITS CURRENT POR, OR 5 MINUTES |
| 7. | TWO-THIRDS OF THE RUNS HAVE EITHER HFc1 OR HFc2 NONZERO |
| 8. | ONE-FIFTH OF THE RUNS IN 7 ABOVE HAVE BOTH HFc1 AND HFc1 NONZERO |
| 9. | THE 82 INTERACTIONS THAT ARE NOT CONSIDERED SHOULD NOT ALIAS ANY OF THE MAIN. QUADRATIC, CUBIC, AND INTERACTIVE EFFECTS CONSIDERED |

OPTIMIZATION METHOD AND SYSTEM HAVING MULTIPLE INPUTS AND MULTIPLE OUTPUT-RESPONSES

FIELD OF THE INVENTION

This invention relates to a method and system for optimizing a steady-state performance of a process having multiple inputs and multiple output-responses.

INTRODUCTION TO THE INVENTION

A problem addressed by this invention is that of optimizing a process with multiple inputs and multiple responses and objectives. For example, the process can be a semiconductor manufacturing process, such as sputter deposition or thin film electrochemical plating of thin film for disk read/write head, or a business process with resources and cancel/return policy as inputs and cycle time and profit as responses, etc. There are several kinds of objectives that are usually required:

1. Type I objective

Find inputs that enable the responses or outputs of the process to satisfy a set of constraints or specifications.

2. Type II objective

Find inputs such that the yield of the process can be maximized, with yield being the probability of satisfying the constraints or specifications on multiple responses given uncertainties or random variations of inputs. This is the problem of process window optimization or yield maximization or design centering.

3. The combination of Type I and II above. This is the case when both the statistical performance (the yield under input fluctuation) and the nominal performance (the target or center of the process window) are simultaneously considered. In this case, Type I applies to the nominal performance while Type II applies to yield. In addition, other engineering constraints can be imposed, and again Type I objective would be used.

4. Type III objective

Find inputs such that multiple objectives, usually mutually conflicting, are achieved. Each objective could be to maximize or minimize a response, or to drive a response as close to target as possible.

5. The combinations of all the above.

The problem is how to find solutions that satisfy all three types of objectives simultaneously. In the summary section that follows, an overview of the deficiency of the state of the art is reviewed, providing a reason for the need of this invention.

SUMMARY OF THE INTRODUCTION

In the previous section, five types of objectives are listed. There are really three generic types, since the third and fifth types are just combinations of the other three. Methods in the field of DOE (Design of Experiment) and process optimization statistical packages generally only deal with Type I objective. Design centering (Type II objective) is not dealt with, and only a scalar function, usually a particular response or a weighted sum of multiple responses, is optimized subject to some constraints or specifications. Thus, true Type III objective is also not considered. Methods in the field of statistical circuit design and yield optimization deal with Type II objective only. Methods in the field of Multi-Objective optimization deal with Type III objective. In the real world, however, all three objectives are important, but there do not exist methods that consider them simultaneously.

This invention presents a unified approach, called the Constraint Satisfaction Herding (CSH) technique, that deals with the combination of all these three types of objectives. Furthermore, even for any one given type of objective, CSH offers an advantage over the conventional approaches in the respective fields mentioned above.

For example, for Type I objective, the existing DOE statistical methods and software packages cannot find global optimum solutions. Furthermore, if there are multiple solutions, only one can be found. For Type II objective, not only does the above mentioned global solution and multiple solution problems remain, but also Type II objective can have a "region" of solutions, and existing methods produce only one solution and do not take advantage of it, while CSH can optimize Type III objective on top of this "region" of solutions for Type II solutions. For type III objective, existing methods present only one solution among the set of non-dominated solutions, while CSH presents many solutions within the non-dominated set. Most important of all, CSH can simultaneously consider an arbitrary combinations of the three types of objectives, and is modular in the sense that any type of objective can be added in or taken out at will without starting all over from scratch. It offers an object-oriented approach. These advantages, together with several other ones, will be evident when CSH is described in detail in the following sections.

Accordingly, we now disclose a method for optimizing a steady-state performance of a process having multiple inputs and multiple output-responses. The method comprises the steps of:

1) specifying three types of objectives, wherein:
   (i) objective type I comprises finding inputs that enable the responses of the process to satisfy a set of constraints;
   (ii) objective type II comprises finding inputs such that the process is maximized, with yield being the probability of satisfying the constraints on multiple responses given random variations of inputs;
   (iii) objective type III comprises finding inputs such that multiple mutually conflicting objectives are satisfied; and
2) generating a solution satisfying simultaneously all three types of objectives.

In another aspect, the present invention includes a system for optimization of a physical process, the system comprising:

1) means for specifying a sequence of experiments on the physical process;
2) means for creating a mathematical representation of the physical process;
3) means for optimizing a steady state performance of the physical process by specifying three objectives, wherein:
   (i) objective type I comprises finding inputs that enable the responses of the process to satisfy a set of constraints;
   (ii) objective type II comprises finding inputs such that the yield of the process is maximized, with yield being the probability of satisfying the constraints on multiple responses given random variations of inputs;
   (iii) objective type III comprises finding inputs such that multiple mutually conflicting objectives are satisfied; and
4) means for using the mathematical representation of the physical process for generating a solution satisfying simultaneously all three types of objectives.

BRIEF DESCRIPTION OF THE DRAWING

The invention is illustrated in the accompanying drawing, in which:

FIG. 10 comprises an Input Variables Table;

FIG. 11 comprises an Output-Response Table;

FIG. 12 comprises a Constraint Table;

DETAILED DESCRIPTION OF THE INVENTION

Figure 1:
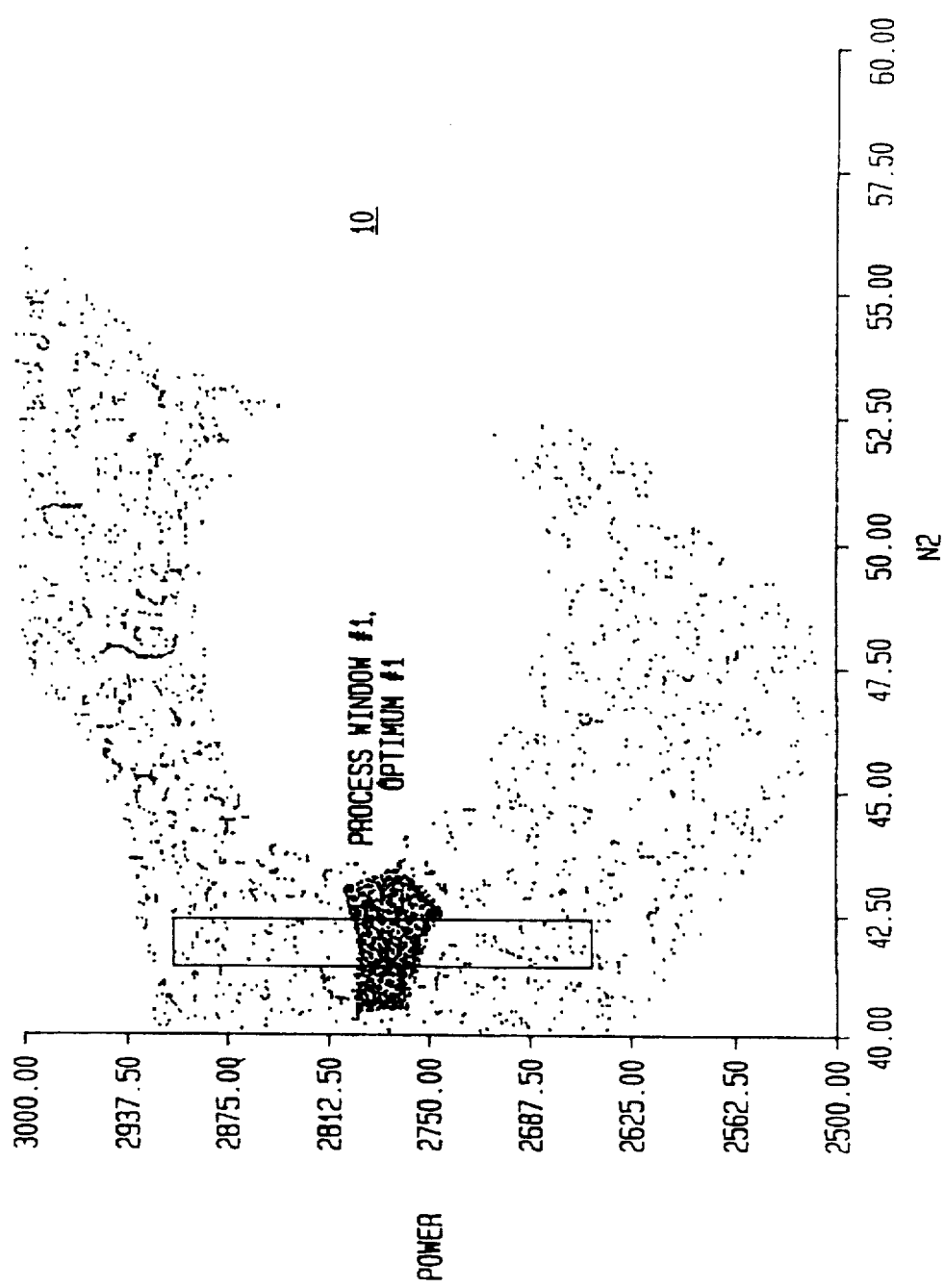
FIG. 1 shows a solution space satisfying the Type II objective.

Overview of Process Optimization with Type I, II and III objectives

Before we describe the CSH approach, we first overview the scenario of process optimization with the combinations of the three types of objectives. First, each of the Type I, II and III objectives is reviewed, and discussions follow to set the stage for proposing the CSH approach.

Type I objective

This objective is for the purpose of optimizing the performance at the nominal set point of the process rather than the statistical performance such as yield. Let X be the input for the process or system to be optimized, and X is a k-dimensional vector, with its ith component being $x_i$. Let $\Omega_X$ be the region of input for optimizing the objective. $\Omega_X$ is usually a rectangular region defined as:

$$\Omega_X = \{X | x_{li} \leq x_i \leq x_{ui}\} \quad (1)$$

where $x_{li}$ and $x_{ui}$ are the lower and upper bound for $x_i$. Let Y be the r-dimensional vector, representing the multiple outputs or responses of the process, i.e., $Y: R^k \rightarrow R^r$, with the ith component being $y_i$, $i=1, \ldots, r$. Let $g_i$ be a nonlinear function of X representing a set of m constraints on the inputs. Then Type I problem is Find X such that $y\_L_i \leq y_i \leq y\_U_i$, $i=1, \ldots, r$ $g_i \leq 0$, $i=1, \ldots, N_g$ $X \in \Omega_X$ \quad (2)

where $y\_L_i$ and $y\_U_i$ are the lower and upper specs for the ith response $y_i$, and $N_g$ is the number of constraints for $g_i(X)$.

Although $y_i$ is the output or response of the system while $g_i$ is the additional constraint functions, mathematically, they both are constraint functions, and from now on, we assume that $g_i$ is just another $y_i$. As an example, consider a Reactive Ion Etching process optimization problem. The inputs are power, gas flow rates, pressure, and the responses are etch rate and uniformity. The goal is to find input combinations that achieve a minimum of etch rate (say, 4000 ansgrom per minute) and a minimum of uniformity. Note that in (2), generally, the solution is not unique. The region defined by all the possible solutions to (1) is called the Input Acceptability Region or Input Feasibility Region. Generally, those who consider only Type I objective also minimize or maximize one scalar function among the choices in the Input Feasibility Region, namely, Minimize: f(x)

such that: $y\_L_i \leq y_i \leq y\_U_i$, $i=1, \ldots, r$ \quad (3)

where f(x) could be one among the following cases:

1. $f(x)=y_i(x)$ for a particular i.

The reason why only one response is used is that when more than one response is used, multiple-objective problem has to be solved, which is much more difficult.

2. f(x) is a linear combination or some scalar function of all of the responses such as the sum of squares of errors between the responses and the targets. This again is a means of avoiding the more difficult multi-objective optimization problem.

In either case, the optimization is solved by the standard constrained optimization methods such as the Sequential Quadratic Programming (SQP), Feasible Direction method or Linear Programming method.

Type II objective

This objective is essentially a Design Centering problem or Process Window Optimization problem. This problem has been treated extensively in the circuit design area, but completely overlooked in the DOE and statistical process control and optimization area. The goal is to place the input recipe X such that all of the responses satisfy the specification under the normal manufacturing fluctuations or other types of uncertainties of X. Let the A be the Input Acceptability Region such that $$A = \{X | y\_L_i \leq y_i(X) \leq y\_U_i, i=1, \ldots, r\} \quad (4)$$

Let $R_T(X_0)$ be the tolerance region enclosing the variations of X centered at $X_0$. A few examples of $R_T$ are:

1. A rectangular box when the variation of X is uniformly distributed:

$$R_T(X_0) = \{X \in R^k | x_i = x_i^0 + a t_i\} \quad (5)$$

2. An ellipsoid enclosing the n σ variation when the variation of X is normally distributed:

$$R_T(X_0) = \left\{ X \in R^k | \sum_i^k \frac{(x_i - x_0)^2}{\sigma_i^2} \leq n \right\} \quad (6)$$

This is illustrated in FIG. 1, numeral 10. This is the situation for plating TnN thin film on Oxide for back-end-of-line stud in CMOS 6X. The rectangular box is the tolerance region, the red-dotted region is the feasibility region in the input space satisfying the specs, and the green region is the solution region satisfying the Type II objective described below.

The Type II objective is:
Find X $$\text{such that } R_T(X) \in A \quad (7)$$

Again, just like Type I objective, there is usually a "region" of solutions for (7). It is even possible to have multiple regions of solutions. FIG. 1 shows such an example in a real semiconductor manufacturing problem. Existing methods in Design Centering do not end up with a region of solutions. Instead of solving the problem defined in (7), Type II objective is defined as choosing the X that maximizes $R_T(X)$ that fits into Input Acceptability Region A(even if the resultant $R_T(X)$ is bigger than what is necessary) and therefore, there is no longer a "region" of solutions, but rather distinctive solutions. The problem is to find the X in A such that the shortest distance from X to the border of A is maximized. The problem can be defined as an outer and inner problem as follows:

Outer Problem $$\max_X \min_{i \in J} \max(d_i^U(X), d_i^L(X))$$

subject to $$y\_L_i \leq y_i(X) \leq y\_U_i, \, i=1, \ldots, r$$

where $d_i^U(X)$ and $d_i^L(X)$ is obtained from the following inner problem:

Inner Problem $$d_i^U(X) = \min_{X_d} \|X - X_d\| \quad (8)$$

subject to: $y_i(X) = y\_U_i$, $$d_i^L(X) = \min_{X_d} \|X - X_d\|$$

subject to: $y_i(X) = y\_L_i$

The problem formulation in (7) is preferable because it locates the entire region that leaves just enough room for the tolerance needed, and allows room for optimizing other objectives such as the Type III objectives.

Many extant methods focus on approximating the Input Acceptability Region A with either piecewise linear polyhedra or ellipsoid. Then, the tolerance region $R_T(X)$ is embedded into the approximation. After the embedding step, the approximation is improved until no progress can be made. One problem is that as the dimension of the input parameters increases, the computation needed to maintain a good approximation to A grows exponentially. To overcome this curse of dimensionality, Monte Carlo methods are used to estimate the yield, and by an iterative process, a direction of search to improve yield is to be found and a line search along this direction is performed iteratively. There are numerous other related methods, but all of these suffer from the lack of ability to locate multiple or global optimums, high computation cost, and not taking advantage of the existence of a "region" of solutions as defined in (7) to further proceed to deal with Type III objective.

Type III Objective

This is the Multiple Objective optimization (MO) or the Multiple Criteria Optimization (MCO) problem. This objective is to maximize, minimize or drive to target all or part of the r responses $Y=(y_1, y_2, \ldots, y_r)$ simultaneously. We can translate the problem to minimizing all the responses by inverting the signs of all the responses that are to be maximized, and substituting those responses to be driven to target with $(y_i - \tau_i)^2$, where $\tau_i$ is the target for $y_i$. The major difference between Type III objective and the traditional single objective optimization is that in a finite domain, there always exists at least one X that minimizes a single objective, while there usually does not exist any X that minimizes all of $y_i$, i=1,...,r, simultaneously. It is very rare that all of the $y_i$s have identical X in minimizing each of $y_i$. Therefore, the single objective optimality is replaced by Pareto-optimality or noninferiority or nondominance or efficiency. Before we describe the noninferior solutions, we first define the feasible region $\Gamma_y$ in the objective function space:

$$\Gamma_Y = \{y | y = y(X), X \in \Omega_X\}$$

Figure 2:
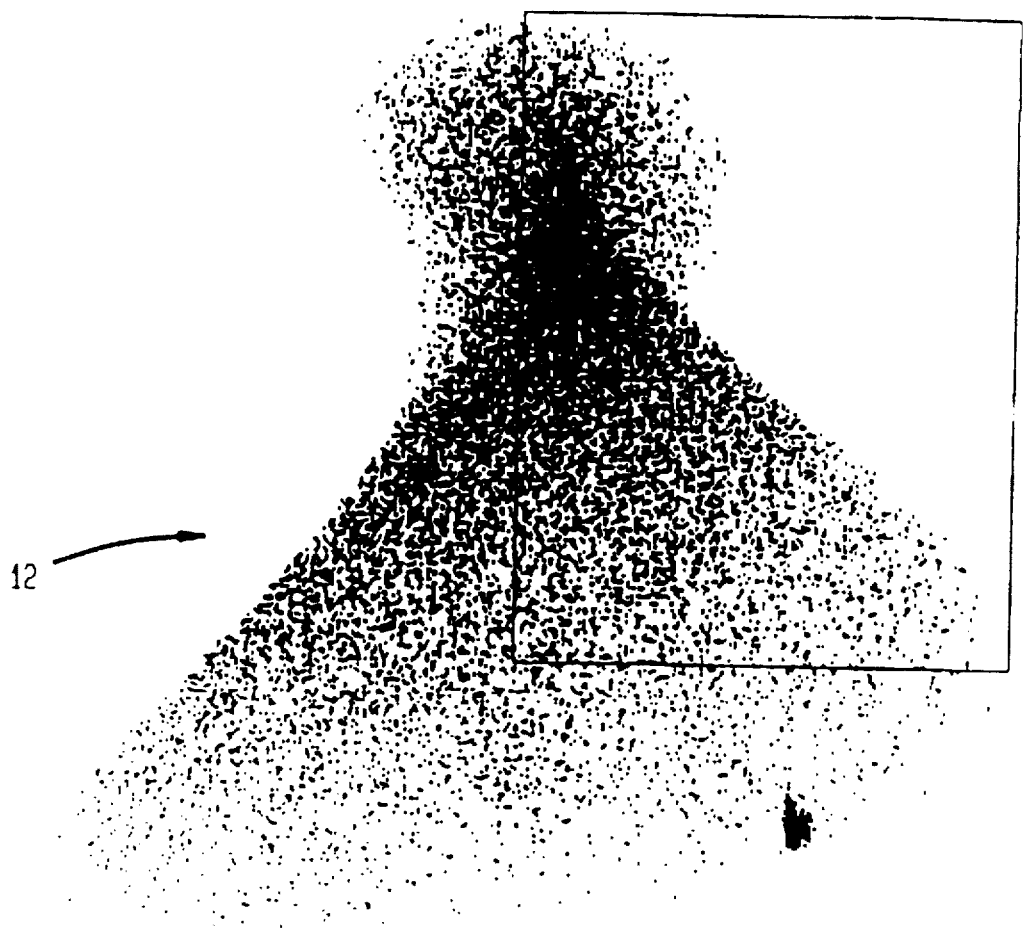
FIG. 2 shows a feasibility region in an objective space for reactive ion etching.

Note that $\Gamma_Y$ is the projection of $\Omega$ into the response space via the response mappings $y_i$'s. An example is shown in FIG. 2, numeral 12 where $\Gamma_Y$ for RIE (Reactive Ion Etching) process in semiconductor manufacturing. There are two responses, namely the etch rate and uniformity. Each response is modelled as a second order polynomial. Now, we define the pareto-optimal or non-inferior surface r solutions as:

$X^* \in$ non-inferior surface if there exist no other X such that (1) $y_i(X) \geq y_i(X^*)$ and (2) $y_j(X) > y_j(X^*)$.

In other words, for any point outside of the non-inferior surface is worse than any point in the surface for at least one response. Among the points in the non-inferior surface, switching from one point to another means gaining at some objective at the expense of another objective. That is why the non-inferior surface is also called the trade-off surface. In FIG. 2 the non-inferior surface is the outline of the feasibility surface enclosed by the rectangular box. The goal of MO or Type III objective is to find the non-inferior surface.

Figure 3:
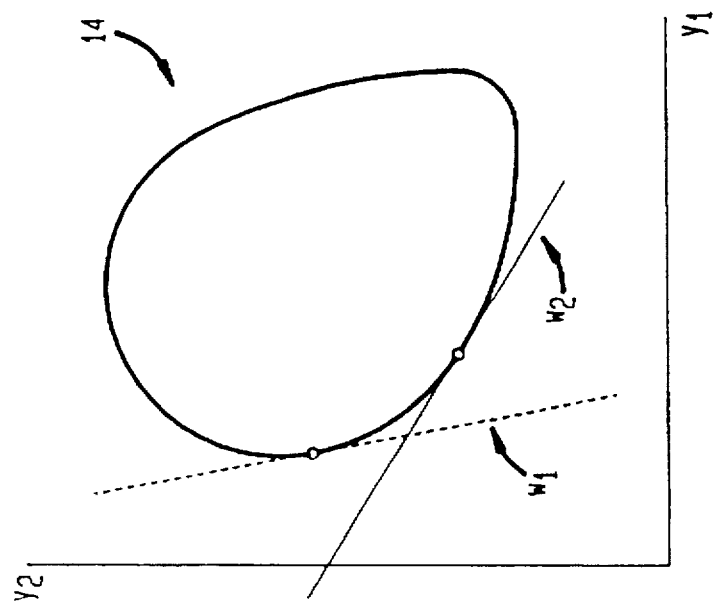
FIG. 3 shows a one-point solution offered by the weighted sum method.

The most common existing methods is to bypass the difficult MO problem by merging the multiple objectives into a single objective, such as a linear combination or the sum of squares. FIG. 3, numeral 14, shows that optimizing the linear sum of all the objectives is equivalent to finding the tangent point of the hyperplane (or line in this case) formed by the weights used in the linear sum with the feasible region $\Gamma_y$ in the response space. The solution is always one point on the non-inferior surface, but the usefulness of this method for general application is rather limited, since it is based on certain convexity-concavity assumptions and such assumptions are not always satisfied by most multiple-objective problems. Non-inferior solutions obtained by this method are often found to be so few and so extreme, that there seems to exist no middle "ground" that may actually exist.

Figure 4:
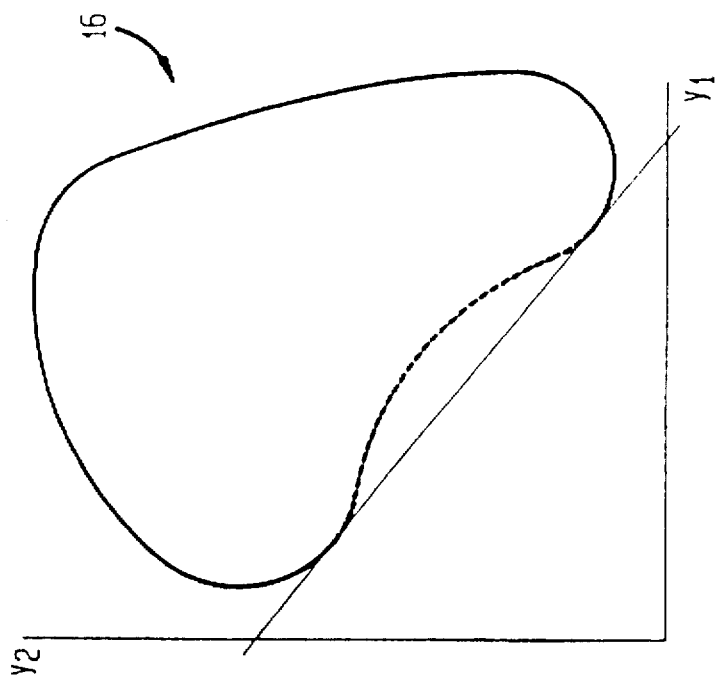
FIG. 4 shows that when a feasibility region in objective space is not convex, the non-inferior surface between the two tangent points cannot be reached by a weighted sum method.

In FIG. 4, numeral 16, the entire section of the non-inferior surface or front between the two tangent points of the straight line can never be reached by any kind of linear sum of the objectives.

Figure 6:
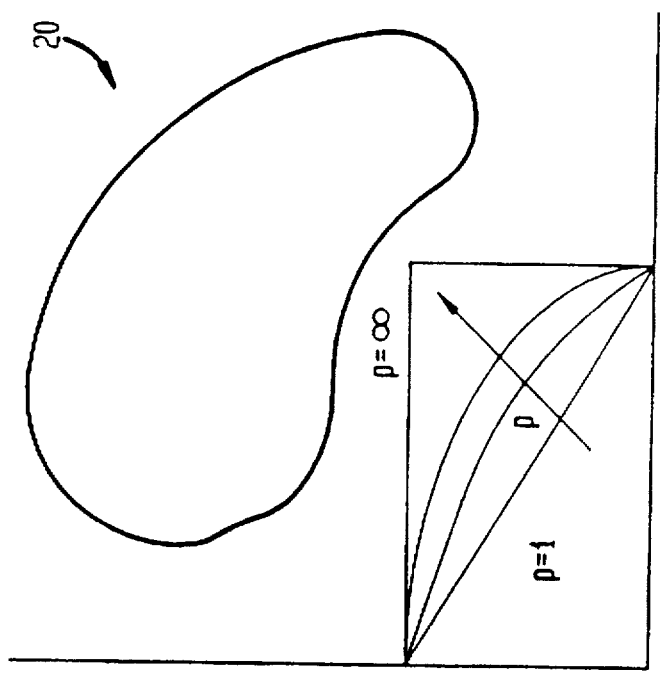
FIG. 6 shows a shape of the least path approximation for finding one point on the non-inferior surface, with various values of p.
Figure 5:
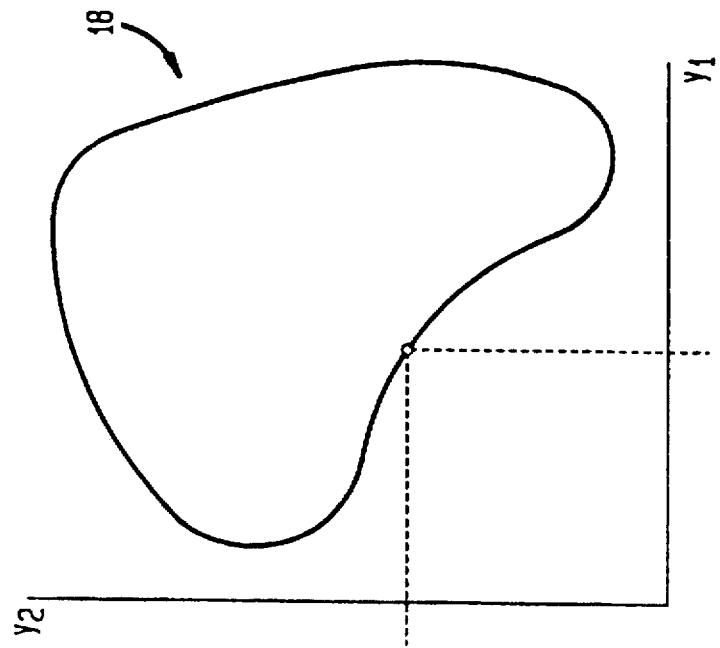
FIG. 5 shows a process of finding a point on the non-inferior surface using a weighted p-norm technique or least path approximation technique, with p approaching infinity.

Other approaches for obtaining non-inferior solutions include the weighted infinite-Norm technique and the weighted p-norm technique. These techniques are equivalent to bending the straight line in FIG. 4 so that it "touches" the portion in the non-inferior surface untouchable by the hyperplane for the linear sum approach. FIG. 5, numeral 18, depicts the situation, where the case with $\rho \to \infty$ is depicted. When $\rho$ is finite, the two dashed line segments become a continuous bent curve, as shown in FIG. 6, numeral 20. The optimization problem is formulated as:

$$\min_{X} (\Sigma(w_i y_i)^\rho)^{1/\rho} \quad (9)$$

Two other approaches to obtain non-inferior solutions are the so called "$\epsilon$ Constraint Method" and the "Proper Equality Constraints". These two, together with the p-norm and the linear sum technique, attempt to reach the non-inferior surface one point at a time, making it extremely expensive. Furthermore, they cannot be combined with Type II objective. Some authors did report methods to treat Type II objective as one particular objective in the MCO (Type III) formulation, but such a method is not practical. Furthermore, such formulation does not take advantage of the "region" of solutions in Type II objective.

The above mentioned several approaches, though slow and one point at a time, at least provide a means of attempting to get the entire set of the non-inferior surface. There are many approaches that casts all the objectives into one single objective using some sort of scalarization, resulting in getting only one point on the non-inferior surface. One example is the Desirability function approach that has been used a lot in some statistical packages (Expert Design, SAS, etc.). The geometric mean of all the responses is used as the objective.

The Constraint Satisfaction Herding (CSH) approach

A Few Observations

From the definitions and discussions of the three types of objectives in the previous sections, we can make the following observations:

a. Each of the objective of Type I and Type II is in general a constraint in the sense that there is one or more regions of solutions. Because of the existence of region, it leaves room for further optimization.
b. As a result, when considering all three types of objectives simultaneously, there are often time numerous constraints. There are the following categories of constraints:

1) Each of the r responses $y_i$s has its own upper and lower specs (one of which could be at infinity), resulting in up to two constraints for each response. In many semiconductor or industrial process optimization problems, more than five or ten responses are not uncommon, meaning that ten or twenty responses as a result of the specs on responses happen easily.
2) The category above is due to the specifications on the responses, and they are the constraints defining the feasibility region A when maximizing the yield, but the constraints on the nominal set points or the center of the tolerance zone or process windows are a different set of constraints. There are more stringent constraints compared with those for the previous category and could be as many as r such constraints.
3) The constraints $g_i(X)$ in (2) represent any engineering constraints and there could be many.
4) The constraint in (7) for Type II Objective, i.e., $R_T(X) \in A$, namely, that the tolerance zone being completely inside the input feasibility region, is equivalent to about k constraints, where k is the number of parameters in input X. For example, if $R_T(X)$ is rectangular, than the constraint is (7) is equivalent to having the size for tolerance or uncertainty for each variable smaller than the closest distance from the boundary of input feasibility region A to X.

From the above, it is seen that if there are ten inputs and ten responses, there can be easily more than forty constraints. These constraints can be changed frequently. With conventional optimization techniques with constraints, the optimality (the Kuhn-Tucker equations) entails the derivatives of the constraints. The large number of constraints adds great difficulties to the computational burdens, the convergence and the robustness of the algorithms. Furthermore, since the constraints can be added in, deleted, changed, etc., each time a change is made, the optimization has to start all over again.

The Wish List (Which Become the List of Advantages for CSH)

With the above observations, together with the shortcomings of the existing techniques for the three types of objectives described in Sec. 'Three-objective', and the fact that no existing methods deal with all three types of objectives simultaneously, we arrive at the following 'Wish List' for a desired methodology.

1) Able to consider all three types of objectives simultaneously.
2) When any constraint is changed, deleted or included, the procedure need not start all over again. The intermediate results should be used.
3) Able to locate multiple "pockets" of solutions.
4) Able to handle large amount of constraints without losing the robustness, ease of implementation, and the tractability.

It will be seen that the CSH method to be described below can satisfy the wish list.

The Methodology

The CSH approach deals with the large multitude of constraints sequentially, modularly and identically. The constraints are dealt with in the following order:

1) The constraints in the Type I objective applying to the nominal performance of the responses. The total number of constraints is r. They are:

$$y\_nominal\_L_i \leq y_i \leq y\_nominal\_U_i, i=1, \ldots, r \quad (10)$$

If however, that there is no constraint on the nominal performance of the responses, then the constraints on the statistical performance of the responses (those pertained to Type II objective) can be used instead. They are:

$$y\_L_i \leq y_i \leq y\_U_i, i=1, \ldots, r \quad (11)$$

where $y\_L_i$ and $y\_U_i$ are the lower and upper specs used in defining the yield. In either case, the total number of constraints is r.

2) The constraints $g_i(X)$ representing the engineering considerations and constraints. The total number of constraint is $N_g$.
3) The constraint $R_T(X) \in A$ used in the Type II objective.

There are a total of $N_s=r+N_g+1$ constraints. CSH method starts with a set of control points randomly distributed in the input domain $\Omega_X$ in (1). These control points are driven into $R_T^{(1)}$, which is the feasibility region for the first constraint $y\_nominal\_L_1 \leq y_i(X) \leq y\_nominal\_U_1$, still randomly distributed with the same number, by the Constraint Satisfaction Herding (CSH) operation (CSH will be described in detail later). Note that if there are no constraints on the nominal performance of the responses, then the constraints $y\_L_1 \leq y_i(X) \leq y\_U_1$, will be used instead. Then these points are driven into the feasibility region for the next constraint, and so on. Now let's define the following notations:

$N_c$: the total number of control points at any stage $\Phi_i$: the collection of control points after all the $N_c$ are driven to satisfy the ith constraint $R_T^{(i)}$: the feasibility region satisfying all the constraints prior to and including the ith constraint The number of points $N_c$ is around 10 times the dimensionality of X. The process of applying CSH to drive $\Phi_i$ into $\Phi_{i+1}$ is represented as:

$$\Phi_{i+1}=CSH[I_i, i]\{\Phi_i\} \qquad (12)$$

where $\Phi_{i+1} \in R_T^{(i+1)}$, $\Phi_i \in R_T^{(i)}$, and $I_{i-1}$ is the collection of indexes for all the constraints.

In (12), $I_i$ and i enclosed in the bracket right after CSH indicates the set of constraints being satisfied. The first argument $I_i$, which is defined as $I_i=\{1,\ldots,i\}=\iota(i)$, indicates the collection of indexes for the constraints that were already satisfied by $\Phi_i$ before CSH is applied, and the second argument i indicates the new constraint that is to be satisfied by CSH. CSH makes sure that not only is the new constraint satisfied, but also the old ones $I_i$. The details of CSH will be described later. Notice that if any constraint after the (i−1)th constraint is changed, all the work done before creating $\Phi_i$ need not be wasted. The procedures picks up from $\Phi_i$. When all the three categories of constraints listed above are processed, $\Phi_{N_s}$ contains $N_c$ control points randomly distributed in the $R_T^{'N_s}$, satisfying all the constraints. These $N_c$ control points are then driven into the non-inferior surface $\partial\Gamma_Y$ by multi-objective algorithm to be described below. Let $CSH_{MCO}$ denote this driving process or operator, then we have:

$$\Phi_{MCO}=CSH_{MCO}(\Phi_{N_s}) \qquad (13)$$

All $N_c$ control points in $R_T^{N_s}$ would then be spread out randomly in $\partial\Gamma_Y$ and are the final solutions for the three objectives. They satisfy all the constraints, and are also the non-inferior solutions for Objective III. The designer or DM (decision maker) can choose solutions among these solutions in $\Phi_{MCO}$ or optimize further with additional objectives. The following summarizes the procedures for obtaining $\Phi_{MCO}$:

Step 1: Establish $N_s$ constraints, where the first r constraints are the ones in (10) if constraints on nominal performance are called for, or those in (11) otherwise. The next $N_g$ constraints are the ones for $g_i$'s. The last one is $R_T(X) \in A$.

Step 2: Generate $N_c$ points $\Phi_1$ randomly filling $\Omega$. Set i=1.

Step 3:

$$\Phi_{i+1}=CSH[I_i, i+1](\Phi_i)$$

with $I_i=\iota(i)$.

Step 4: i=i+1;

If $i<N_s$, go to Step 3; Else, go to Step 5.

Step 5:

$$\Phi_{MCO}=CSH_{MCO}(\Phi_{N_s})$$

Now we consider a slightly more complex version of the algorithm. The intention is to locate all possible solutions when the feasibility region $R_T^{(i)}$ is split into several disjoint regions, and the best solutions in all the regions are to be found. Due to the nature of $\Phi_i$, namely that it is composed of a collection of points randomly filling the feasibility region $R_T^{(i)}$ at each stage (after satisfying constraint i), clustering can easily be done on $\Phi_i$ so that those points in $\Phi_i$ belonging to each distinctive subregion are separated and further optimization is done on each subregion. First we define some notations. At the end of satisfying all the constraints for the nominal performance and the constraints due to engineering considerations (the first two types of constraints in Section 3), the feasibility region has been denoted as $R_T^{(r+N_s)}$. Let N_#_cluster be the number of distinctive subregions in $R_T^{r+N_s}$, and let $R_T^{(r+N_s)(i)}$ be the ith subregion in $R_T^{(r+N_s)}$. Also, let $\Phi_{r+N_g}^{(i)}$ be the collection of points in $\Phi_{r+N_g}$ that belong to $R_T^{(r+N_s)(i)}$. The clustering process becomes:

$$\{\Phi_{r+N_g}^{(i)}|i=1,\ldots, N\_\#\_clust\}=CLUSTER(\Phi_{r+N_g}) \qquad (14)$$

After the clustering process, CSH is applied to each of the $\Phi_{r+N_g}^{(i)}$ for satisfying the constraint $R_T(X) \in A$ for Type II objective now becomes:

$$\Phi_{N_s}^{(i)}=CSH[I_{r+N_g}, N_s]\Phi_{r+N_g}^{(i)} \qquad (15)$$

where superscript (i) indicates which subregion is referred to. Sometimes, at the end of the operation in (15), each subregion may further be clustered in a number of subregions. For each of the $\Phi_{N_s}^{(i)}$, the clustering process will then produce N_dcp_cluster$_j$ clusters, as expressed below:

$$\{\Phi_{N_s}^{(i,j)}|j=1,\ldots, N\_dcp\_cluster_j\}=CLUSTER(\Phi_{N_s}^{(i)}) \qquad (16)$$

The Type III MCO is then applied to each (i,j)th region separately. In summary, the algorithm became the following:

Step 1: Establish $N_s$ constraints, where the first r constraints are the ones in (10) if constraints on nominal performance are called for, or those in (11) otherwise. The next $N_g$ constraints are the ones for $g_i$'s. The last one is $R_T(X) \in A$.

Step 2: Generate $N_c$ points $\Phi_1$ randomly filling $\Omega$. Set i=1.

Step 3:

$$\Phi_{i+1}=CSH[I_i, i+1](\Phi_i)$$

with $I_i=\iota(i)$.

Step 4:

i=i+1

If $i<r+N_g(=N_s-1)$, go to Step 3;

Else, go to Step 5.

Step 5:

$$\{\Phi_{r+N_g}^{(i)}|i=1,\ldots, N\_\#\_clust\}=CLUSTER(\Phi_{r+N_g})$$

Step 6:

$$\Phi_{N_s}^{(i)} = CSH[I_{r+N_g}, N_s](\Phi_{N_s}^{(i)})$$

Step 7:

$$\{\Phi_{N_s}^{(i,j)}|j=1, \ldots, N\_dep\_cluster_j\} = CLUSTER(\Phi_{N_s}^{(i)})$$

Step 8:

For each (i,j), do the following:

$$\Phi_{MCO}^{(i,j)} = CSH_{MCO}(\Phi_{N_s}^{(i,j)})$$

Figure 7:
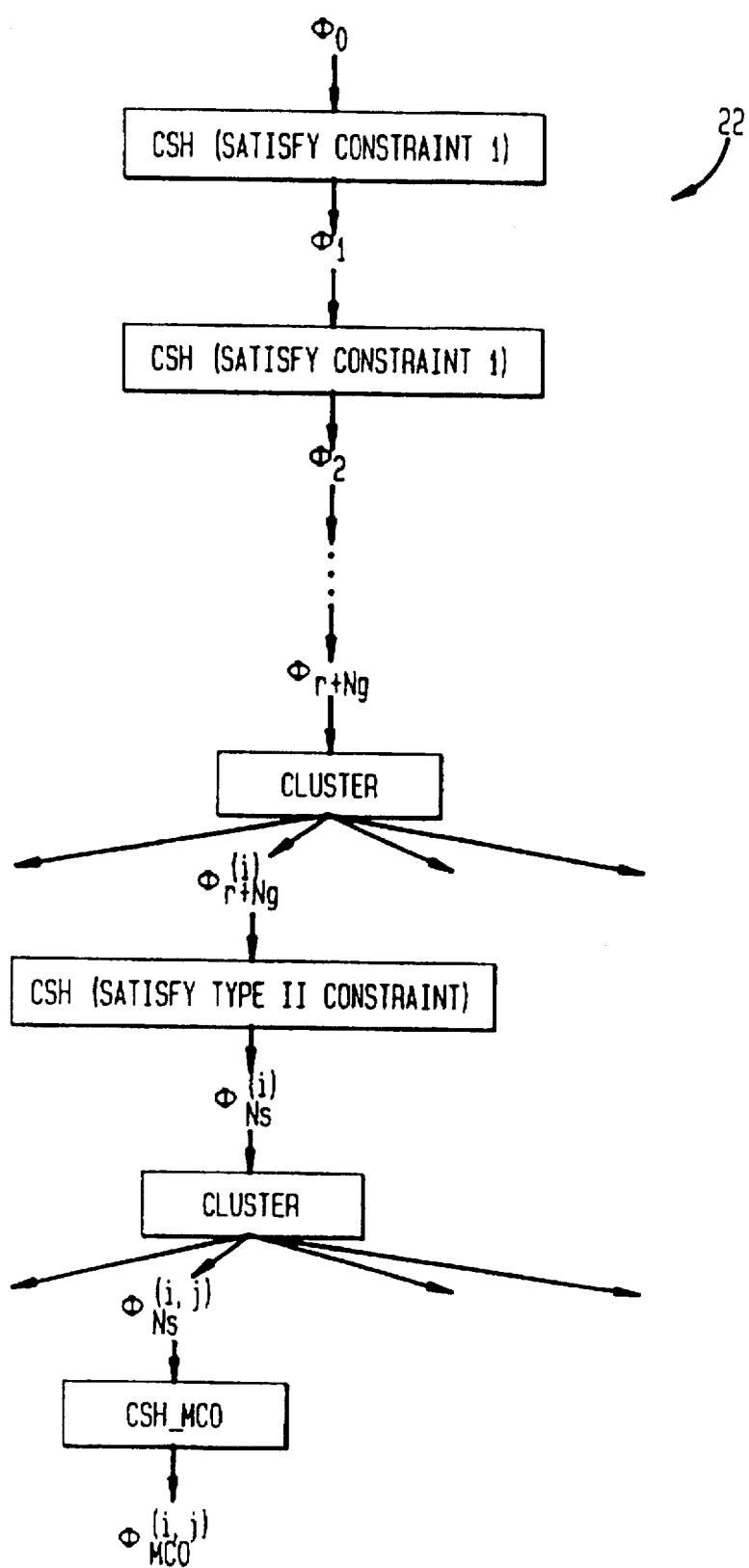
FIG. 7 illustrates a constraint satisfaction herding (CSH) algorithm.

In the above algorithm, note that $N_s$ is the total number of constraints and is equal to $r+N_g+1$. FIG. 7, numeral 22, illustrates the algorithm.

Now we are ready to describe the details of the CSH operator.

CSH Operator

Recall that CSH operator is applied in the following Step in the main algorithm:

$$\Phi_{i+1} = CSH[I_i, i+1](\Phi_i) \quad (17)$$

with $I_i = \iota(i)$. Again, the operator $CSH[I_i, i+1]$ means that all the $N_c$ control points in $\Phi_i$, which already satisfy the constraints with indexes in $I_i = \iota(i) = \{1, \ldots, i\}$, are driven by the CSH operator into $\Phi_{i+1}$ satisfying (i+1)th constraint. The CSH operator will be built on top of the control random search (CRS) technique. The existing CRS techniques were mainly designed to optimize scalar functions. When it comes to constraints, CRS simply throw away points failing to satisfy the constraints (or equivalently, points not in the feasibility region). When the feasibility region is small relative to the entire optimization input space, CRS will take prohibitively long time because it is a hit-or-miss process in terms of constraints and therefore is not suitable for this purpose. The new CSH operator described in this invention is specifically designed to deal with constraints, though it can be used to optimize functions without constraints also. Here, the CSH operator not only can do scalar function optimization and constrained optimization, it also can be used (and primarily used here) for driving a group of points already satisfying a collection of constraints into a region further satisfying additional constraints. One of the key concepts is to convert the additional constraint (constraint i+1) into an objective function while keeping the old constraints as given constraints. If the constraint i is characterized by $y\_L_i \leq y_i \leq y\_U_i$, then we first convert it into the following new function G:

$$G(X) = 0 \text{ if } y\_L_i \leq y_i \leq y\_U_i \quad (18a)$$

$$= y_i - y\_U_i \text{ if } y_i > y\_U_i \quad (18b)$$

$$= y\_L_i - y_i \text{ if } y_i < y\_U_i \quad (18c)$$

The main motivation in converting the new constraint into objective while keeping the old constraints as constraints is that by defining G in (18a–c), minimizing G is equivalent to satisfying the constraint, but it is not necessary to start with points already satisfying the constraints. We use the modified CRS algorithm to drive the group of control points to minimize G(X) while satisfying the old constraints. Since the old constraints were already satisfied at initiation, the existing problem of the hit-and-miss problem of CRS in handling constraints is eliminated. As soon as the points hit the region where G(X) is 0, they are frozen there. It looks as if the points are attracted to the region and as soon as they hit the region, they are stuck there. Although G(X) may not be convex, due to the global optimization capability of CRS, all the control points will be driven away from the region in (18b) and (18c) despite the possibility of non-convexity and be driven into the region characterized by (18a). Furthermore, the region characterized by any of (18a), (18b) and (18c) need not be singly connected. Each one can be multiple regions. This gives us the capability of global optimization and locating multiple feasible regions in CSH operator as well as the entire CSH algorithm. Another feature CSH has that CRS does not is that if any of the variable in X is an attribute variable or categorical variable (meaning that it only has meaning at certain discrete values), CSH can still find the optimum while CRS is limited to continuous variable. This is captured in the following algorithm. It is cast in c code but it is only a pseudo code in the sense that some explanations are substituted into the real code for the purpose of clarity. First, the variables have the following meanings:

N: The total number of control points nattrib: the total number of attribute variables N1: The number of points in each of the 2\*\*nattribute divisions of N so that equal number of points in the original N points are assigned for each configuration of the values for the attribute variables i0 loop locates simplex with no duplicate points i1 loop locates a new point satisfying the constraints i2 loop locates a new point improving the worst point performance i3 loop locates the global optimum Now we begin to describe the pseudo code for the algorithm:

```
N1=N/(2**nattrib);
i3=0;
do {i3++; i1=0; i2=0;
    Find maximum among the vector y of length N and
        return m as the index in y holding the maximum
        value ym
    Find minimum among the vector y of length N and
        return pointer 1 as the index in y holding the mini-
        mum value yl
```

```
do {i2 + +;
    rcrs |1| = *1;
    /* rcrs[i] holds the index for the ith input variable. T
    rcrs specfies which among the N control points is now accessed */
    do {i1 + +;
    do {i0 + +;
        if(nattrib < 1){
            for(i = 2;i < = ncrs + 1;i + +)
                rcrs[i] = (random( ) % N) + 1;
            /* rcrs are randomized, except for rcrs[1],
                which holds the index for the minimum value of y*/
        } /* end of if nattrib < 1 */
        else {/* else for if nattrib < 1 */
        ibase = (random( ) % nattrib)*N1;
        /* ibase holds the offset needed to hop between groups
            of points for each of the 2**nattribe regions */
        for(i=1;i < = ncrs+1;i+ +) rcrs[i] = (random( ) % N1)
        } /* end of else for if nattrib < 1 */
    } while(checksimplex(rcrs,ncrs + 1) = = 0); /* enddo for i0 loop */
    centroid(rcrs,x,g,ncrs); /*finds the centroid of the ncrs simplex
        points and store in g */
```

-continued

```
for(i = 1;i < = ncrs;i + +)
  pers|i| = 2.0*g|i|
  -x = |(rcrs|ncrs + 1|)||i|;
  /* pcrs array holds the index for the mirror reflection of the
     worst point in the simplex */
  }while(the old constraints are satisfied); /* enddo for i1 loop */
  fp = G(x) evalued at newly found point at rcrs;
} while (fp-ym > -epsm && (maximum iterations not yet reached));
  /* enddo for i2 loop */
if(fp < = ym-epsm){ y|m| = fp;
  for(i = 1;i < = ncrs;i + +)x|m||i| = pers|i|
    /* the mth element in x holds the worst points in the entire group */
  }
} while (ym-y1 > eps && (maximum iterations not yet reached));
  /* enddo for i3 loop */
```

CSH Operator for Type II objective

Recall that the last constraint deals with the Type II objective. This requires further discussions and treatments here.

G(X) defined in (18a)–(18c) was specifically for the constraints in Type I objective. For Type II objective, it needs to be modified as follows:

$$G(X)=0 \text{ if } R_T(X) \in A \quad (19a)$$

$$=\text{sizeof}(R_T(X)-A) \text{ if } R_T(X) \notin A \quad (19b)$$

In the above, $R_T(X)-A$ means the portion of $R_T(X)$ that is outside of A, and A is the input feasibility region defined in (4). siezof( ) means the size of the region in the argument. In (19a) and (19b), the two key operations that need to be performed are the operation to find out whether $R_T(X) \in A$ for any given X, and the operation of finding out the size of $R_T(X)-A$ for any given X. These can be done by three possible methods.

Method I

Note that since CSH operator always keeps all the control points satisfying the old constraints, which include the constraints for Type I objective, which ensures that X is feasible, or that $X \in A$. Thus, there always exists a positive scale factor s such that $$s \cdot R_T(X) \in A$$

In fact, there is always an s such that $R_T(X)$ barely fits inside A and is tangent to A at some point. The next step is to build an empirical mapping function S from X to such an s, using a few sample points as training samples, and use regression or neural network to estimate the mapping function. Since s in general is a smooth function of X, this can be done in a straightforward way. Once this function is built, the two key operations mentioned above are performed as follows:

$$R_T(X) \in A \text{ if } S(X) \leq 1$$

$$\text{sizeof}(R_T(X)-A)=S(X)-1$$

Note that the mapping function S(X) only has to be built once and then used for any X in any occasion.

Method II

First, use CSH operator to drive a group of control points $\Phi_X$ to be outside of A but inside of $R_T(X)$. This is done by using the constraints that are the opposite or complement of the basic constraints for the responses defined in (2) and the constraints in (6) for $R_T(X)$. Since this is local to X, only a few control points are needed, and thus is not computationally expensive. Then compute the maximum span of these control points and denote it as Span($\Phi_X$). Then the two key operations mentioned above are performed as follows:

$$R_T(X) \in A \text{ if Span}(\Phi_X) > 0$$

$$\text{sizeof}(R_T(X)-A)=\text{Span}(\Phi_X)$$

Method III

This method entails estimating the s in Method I not with an empirical function such as regression or neural network, but with an algebraic method. This is done by constructing a few straight lines passing through X and estimating where the straight lines penetrate A. Then it is straightforward to determine the smallest s that makes $s \cdot R_T(X)$ encloses all of these points of penetration. When all of the responses are polynomials, these points of penetrations can be computed by simple closed form solutions, as shown below:

For responses estimated with 2nd order regression or response surface models, we derive the computational formula as follows:

First, represent the straight line as $$X = X_0 + t \cdot \vec{e} \quad (20)$$

where $\vec{e}$ is the unit vector representing the direction of the straight line and $X_0$ is the base point of interest.

Next, use the following formula for 2nd order response surface model:

$$y_i = b_0 + b^T \cdot X + X^T \cdot B \cdot X \quad (21)$$

where $b_0$, b, and B are a scalar, a vector and a matrix representing the second order response surface model. Next, we substitute (20) into (21) to find the t satisfies both (20) and (21). Once such t is found, this t, when substituted in (20), will give the point of penetration. With (20) in (21), we have:

$$\begin{aligned} y_i &= b_0 + b^T \cdot (X_0 + t\vec{e}) + (X_0^T + t\vec{e}^T) \cdot B \cdot (X_0 + t\vec{e}) \quad (22) \\ &= y_0 + t(b^T \cdot \vec{e} + X_0^T \cdot B \cdot \vec{e} + \vec{e}^T \cdot B \cdot X_0) + t^2(\vec{e}^T \cdot B \cdot \vec{e}) \\ &= y_0 + tb_t + t^2 B_{ii} \end{aligned}$$

where $y_0$ is the value of $y_i$ at $X_0$, $$b_t = b^T \cdot \vec{e} + X_0^T \cdot B \cdot \vec{e} + \vec{e}^T \cdot B \cdot X_0$$

and $$B_{ii} = \vec{e}^T \cdot B \cdot \vec{e}$$

Only the smallest t is desired. Since the specs on $y_i$ is generally two sided and defined in (2), we need to equate (22) with y__$L_i$ and y__$U_i$ to get two values of t, and pick the smaller (in magnitude) of the two. Note that since $X_0$ is already inside the feasibility region and that t=0 corresponds to $X_0$, we are looking for two points of penetrations, one for postive t and the other for negative t. The following gives the procedures:

If $B_{ii} > \epsilon$, then:

if $b_t^2 - 4B_{ii}(y_0 - y\_L_i) > 0$, then $$t = (-b_t \pm \sqrt{b_t^2 - 4B_{ii}(y_0 - y\_L_i)})/(2B_{ii})$$

Else, t is infinity
Else,

If $|b_t| > \epsilon$, $t = 2(y_0 - y\_L_i)/b_t$

Else, t is infinity.

In the above, $\epsilon$ represents a small constant equal to the machine arithmetic precision. Also, the $\pm$ in the expression for t means there are two possible solutions. Note that $y\_L_i$ is used in the above formula. The same should be done for $y\_U_i$ to compute the other t values. Among all these computed t values, the t that is positive and the smallest among all the positive values will be chosen to represent one of the point of penetration. The same goes for the negative t for the other point. If any of the point of penetration is outside of the input space $\Omega_X$ in (1), the point of penetration will then be chosen to be the point when the straight line in (20) penetrates $\Omega_X$ if no extrapolation is permitted.

For third order polynomial response surface, we have the following representation:

$$y_i = \sum_{l=1}^{k} \sum_{m=1}^{k} \sum_{n=1}^{k} \theta_{lmn} x_l x_m x_n \quad (23)$$

where $\theta_{lmn}$ is the leading coefficient for each of the triplet and and is estimated by normal regression or response surface model estimation, while $x_i$ is the ith component of X. Again, we use (20) to represent the straight line and $x_{i0}$ be the ith component of $X_0$. The goal is to find the various values of t to represent the point of penetrations with the boundary of the feasibility region A. Once the various values of t are found, the same logic used in the second order case for selecting the proper t values will be used.

Let the ith component of $\vec{e}$ be denoted as $e_i$. By substituting (20) into (23) and equate the it to $y\_L_i$ (the constraint boundary), we have:

$$y\_L_i = \sum_{l=1}^{k} \sum_{m=1}^{k} \sum_{n=1}^{k} \theta_{lmn}(x_l + te_l)(x_m + te_m)(x_n + te_n) = \quad (24)$$

$$\sum_{l=1}^{k} \sum_{m=1}^{k} \sum_{n=1}^{k} \theta_{lmn} \{x_l x_m x_n + t(x_l x_m e_n + x_l e_m x_n + x_m e_l x_n) +$$

$$t^2(x_l e_m e_n + x_m e_m e_n + x_m e_l e_n + e_l e_m e_n) + t^3(e_l e_m e_n)\}$$

From (24), we have $$y\_L_i = b_{i0} + b_{i1}t + b_{i2}t^2 + b_{i3}t^3 \quad (25)$$

where $$b_{i0} = \sum_{l=1}^{k} \sum_{m=1}^{k} \sum_{n=1}^{k} x_l x_m x_n \quad (26a)$$

$$b_{i1} = \sum_{l=1}^{k} \sum_{m=1}^{k} \sum_{n=1}^{k} (x_l x_m e_n + x_l e_m x_n + x_m e_l x_n) \quad (26b)$$

$$b_{i2} = \sum_{l=1}^{k} \sum_{m=1}^{k} \sum_{n=1}^{k} (x_l e_m e_n + x_m e_l x_n + e_l e_m x_n) \quad (26c)$$

$$b_{i3} = \sum_{l=1}^{k} \sum_{m=1}^{k} \sum_{n=1}^{k} (e_l e_m e_n) \quad (26d)$$

Note that (25) is a cubic polynominal in $t$. Thus the solutions for $t$ are

-continued
given in the following procedure (after $b_{i0}$, $b_{i1}$, $b_{i2}$, $b_{i3}$ are computed from (26a-d)):

```
a1 = bi2/bi3; a2 = bi1/bi3; a3 = bi0/bi3;
Q = (a1*a1 - 3.*a2)/9.; R = (2.*a1*a1*a1 - 9.*a1*a2 +
   27.*a3)/54.;
Q2 = Q*Q*Q - R*R;
if(Q2 >= 0.){
   nroot = 3;
   theta = acos(R/sqrt(Q*Q*Q));
   Q1 = -2.*sqrt(Q);
   t[0] = Q1*cos(theta/3.) - a1/3.;
   t[1] = Q1*cos((theta + 2.*pi)/3.) - a1/3.;
   t[2] = Q1*cos((theta + 4.*pi)/3.) - a1/3.;
   nroot = 3;
}
else { /* single root case, else for if (Q*Q*Q > R*R*/
   nroot = 1;
   Q1 = sqrt(-Q2) + fabs(R);
   Q1 = pow(Q1,1./3.);
   if(R > 0.)t[0] = -(Q1 + Q/Q1) - a1/3.;
   else {if(R < 0.)t[0] = (Q1 + Q/Q1) - a1/3.;
      else t[0] = -a1/3.;
   }
}
```

In the above, at the end, the array t holds the three values of solutions, while a1, a2, a3, Q, R, Q2, theta, Q1 are all temporary variables. If nroot=1, then only one real root exists. Again, (25) is to be repeated with $y\_L_i$ replaced by $y\_U_i$ for computing other values of t for points of penetrations between the straight lines and A. The smallest values (in magnitude) of positive and negative t are to be retained for the final solutions for the points of penetrations. The extrapolation issue is dealt with the same fashion as the second order case described above. In DOE, polynomials of order greater than 3 are seldom used since this usually causes sensitivity problems in regression. Thus, with Method III, a closed form solution can usually be obtained and quite efficient.

Figure 8:
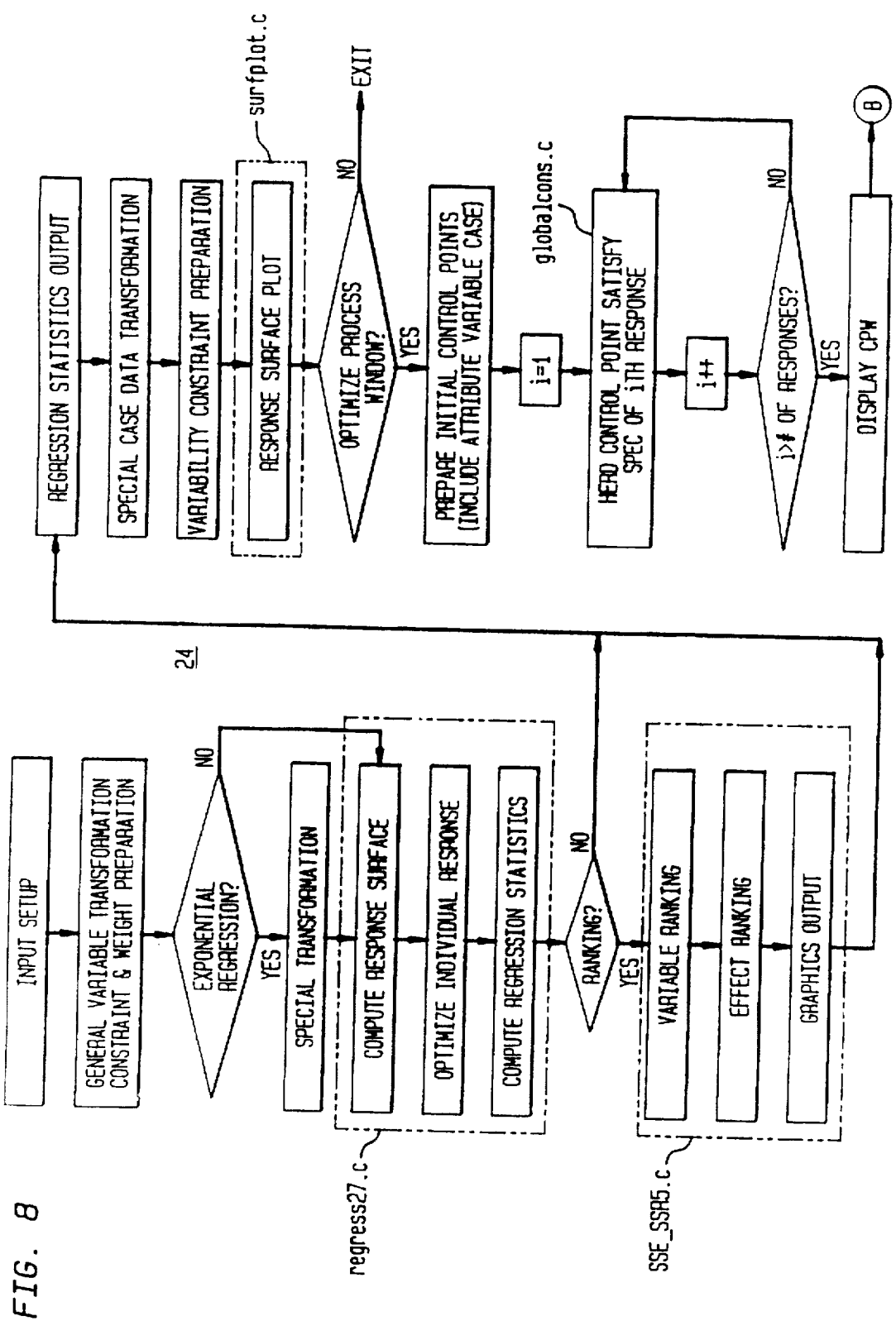
FIG. 8 shows a flowchart characterizing an algorithm of the system for Type I and Type II objectives.

A flow chart characterizing the algorithm of the system for Type I and Type II objectives is shown in FIG. 8, numeral 24.

$CSH_{MCO}$ Operator

Now we are ready to describe the $CSH_{MCO}$ operator, which does the following step in the main algorithm:

$$\Phi_{MCO}^{(i,j)} = CSH_{MCO}(\Phi_{N_s}^{(i,j)})$$

It drives all the points in $\Phi_{N_s}^{(i,j)}$ into the the non-inferior frontier $\partial\Gamma_Y$, becoming $\Phi_{MCO}$. Before we describe the algorithm, we need to define the utopia point $Y_{utopia}$ in the response space. This is the point where each component $y_i$ for $Y_{utopia}$ is at its minimum. Note that usually since, the X that minimizes each response is different for each response, there is no X that maps to $Y_{utopia}$ and so it is outside of the feasibility region. The procedure is described as follows:

Step 1

For all the N, points in $\Phi_{N_s}^{(i,j)}$, rank them according to how close each point is to the utopia point $Y_{utopia}$ in the response surface. Let $rank_i$ holds the index for the element that is ranked the ith. For example, if $rank_3$ holds the value of 5, it means that the 5th element in $\Phi_{N_s}^{(i,j)}$ ranked 3rd in its closeness to the utopia point $Y_{utopia}$.

Step 2

Find the non-inferior subsets among the $N_c$ points in $\Phi_{N_s}^{(i,j)}$ with the following procedure (note that here, the non-inferior subsets may not be on the real non-inferior surface. It only means that they are not dominated by any other points in $\Phi_{N_s}^{(i,j)}$))

17

Step 2.a

Setup an array frontier_flag of size $N_c$, where frontier_flag$_i$ denotes whether the ith point in $\Phi_{N_s}^{(i,j)}$ is part of the non-inferior subset. When frontier_flag$_i$ is set to be off, the ith point is dominated by some point in $\Phi_{N_s}^{(i,j)}$. At the end of Step 2, which ever flag that is not set off is part of the non-inferior subset.

Step 2.b

Set all frontier_flag$_i$ to be on. Set i=1. For each point, compute and store its r response values into array $y_{ij}$, where the subscript i denotes which response it is, while j denotes which point it is.

Step 2.c

Find out whether the ith point is dominated by some other point by the following procedure:

Step 2.c.1: Set j=1
Step 2.c.2
j=j+1
If point i dominates point j, then
set frontier_flag$_j$ to be off.
Step 2.c.3
If j<$N_c$ go to step 2.c.2
Else, proceed to Step 3

Step 3

Gather all the points with :frontier_flag not marked off into an array for the non-inferior set, and call it $\partial\Phi_{N_s}^{(i,j)}$, and let $N_{pareto}$ denotes the number of points in this set. Now use a similar procedure as the CSH operator to migrate $\partial\Phi_{N_s}^{(i,j)}$ toward the true non-inferior surface. At this point, $N_{pareto}$ is most likely much less than $N_c$. As we apply a CSH like procedure to migrate toward the true non-inferior frontier, instead of always maintaining the same number of point as in CSH operator, here we let the number of points grow during the migration until $N_{pareto}$ reaches $N_c$, or any other number the DM chooses in terms of how many non-dominated solutions are desired at the end for choice. For now, we assume $N_c$ to be the final number for $N_{pareto}$. The whole procedure is described below:

Step 3.a

Use the same random procedure in CSH operator (see Sec. III.4 on CSH operator) to generate a new point from $\partial\Phi_{N_s}^{(i,j)}$, and use the same procedure in CSH operator for rejecting the point using the $N_s$ constraints in Type I and II objectives.

Step 3.b

If the new point is accepted in Step 3.a, then:
  If the new point is not dominated by any point in $\partial\Phi_{N_s}^{(i,j)}$, then:
    If any existing point is dominated by the new point, then:
      Discard the dominated old points.
      Include this new point in $\partial\Phi_{N_s}^{(i,j)}$.
      $N_{pareto}=N_{pareto}+1$
    Else:
      If $N_{pareto}<N_c$, then:
        Include this new point in $\partial\Phi_{N_s}^{(i,j)}$.
        $N_{pareto}=N_{pareto}+1$
      Else, discard the new point
  Else, discard the new point
(there are two versions or alternatives from this point on)

Step 3.c (version 1)

Repeat Step 3.a and 3.b until any existing point is deleted as a result of having found a new point that dominates it but the amount of domination (that is, the largest difference in response value) is less than a small value ε, which could be taken as machine arithmetic precision. The remaining points in $\partial\Phi_{N_s}^{(i,j)}$ are the final solutions for the entire procedure. Exit.

18

Step 3.c (version 2)

Repeat Step 3.a and 3.b until $N_{pareto}$ has reached $N_c$. Then drive the existing points in $\partial\Phi_{N_s}^{(i,j)}$ to the true non-inferior surface by the following procedure:

Step 3.c.1

For each point that mains in $\partial\Phi_{N_s}^{(i,j)}$, drive it to the true non-inferior surface by starting with this point and minimize the following function $$H(X) = \min_{X} (\Sigma (w_i y_i)^p)^{1/p} \quad (27)$$

with the weights $w_i$ given by the following:

$$w_i = 1/y_{i\_0}$$

In the above, $y_{i\_0}$ for the computation of the values for $w_i$ is the initial value of $y_i$ for the given point, while $y_i$ in (27) is the intermediate values of the ith response during the process of minimization toward driving the point to the true non-inferior surface. Since the starting points are already close to the true non-inferior surface, H(X) in (27) only need to be minimized with one or two iterations using Conjugate Gradient method.

Again, the remaining points in $\partial\Phi_{N_s}^{(i,j)}$ are the final solutions for the entire procedure. Exit.

EXAMPLE

An example of the present invention is now provided, and reference is made to FIGS. 9–17.

Figure 9:
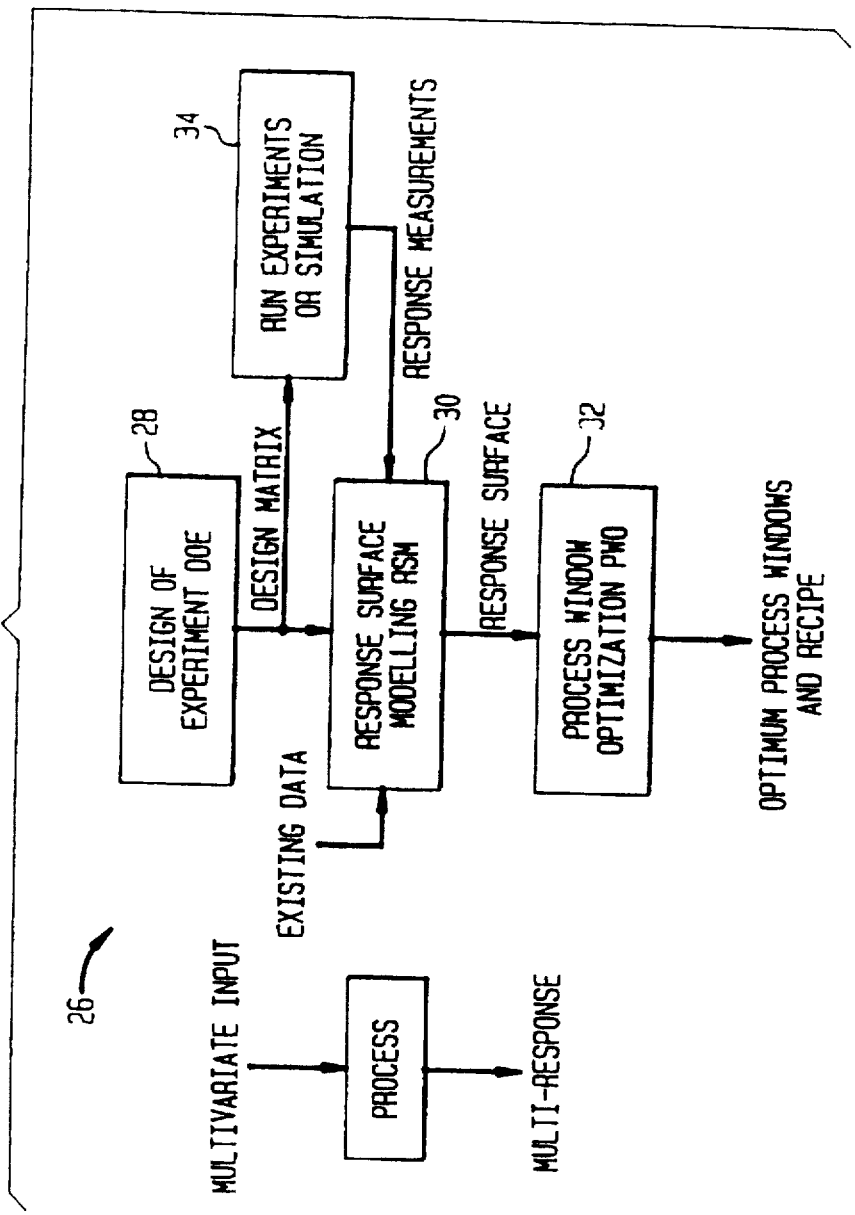
FIG. 9 shows a general system architecture of the present invention.
Figure 13:
FIG. 13 comprises an Effects Table.

FIG. 9 shows a general system architecture 26 of the present invention. In overview, the system architecture 26 comprises a DOE module 28 (Design of Experiment), an RSM module 30 (Response Surface Modeling), and a PWO 32 module (Process Window Optimization). Also shown are sundry input/output entities and a module 34 entitled Run experiments or simulation.

In particular, the DOE module 28 preferably determines a minimum number of runs needed to build the most accurate response surfaces, and to determine the optimum recipe and process windows. The RSM module 30 computes the response surface that fits the data, preferably such that the sum of square error between the data and the response surface is minimized. The RSM module 30 also determines the relative importance of all the input variables for the measured response, and computes the variable and effect ranking chart. The PWO module 32, in turn, can compute the optimum process recipe in the input variable space satisfying Types I, II and III objective, given the response surfaces generated in the RSM module 30. The PWO module 32 can determine the center of the window (i.e., the optimum recipe), the predicted responses for this recipe, and the size of the windows.

The FIG. 9 system architecture 26 can provide a system for optimization of a physical process. Elements of such a system have been summarized above, page 5. These elements are now traced through again, with an intent of referencing by way of figures and tables, particular or preferred such elements.

The first element summarized above comprises means for specifying a sequence of experiments on the physical process, and may be mapped to the FIG. 9 DOE module 28. FIGS. 10 through 14 (numerals 36–44) provide examples, respectively, of input variables, output responses, constraints, effects and chemistry Experiments illustrative of the first element, and based on an enhanced industry standard semiconductor wet-chemical cleaning.

Figure 15:
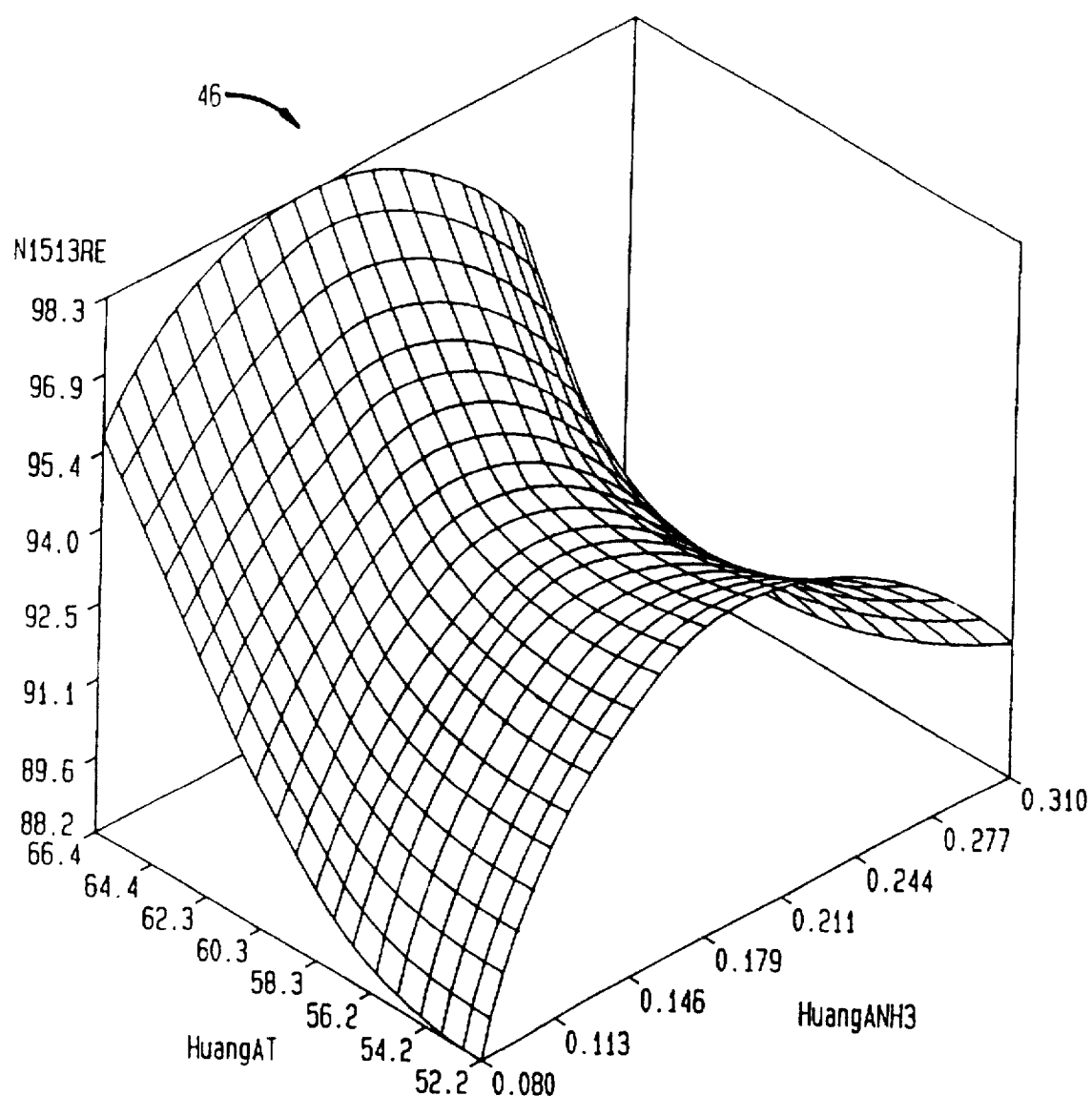
FIG. 15 shows a BestDesign Local Response Surface.

The second element summarized above comprises means for creating a mathematical representation of the physical process, and may be mapped to the FIG. 9 RSM module 30. FIG. 15, numeral 46, provides an example of the second element, and comprises a BestDesign response surface.

Figure 14:
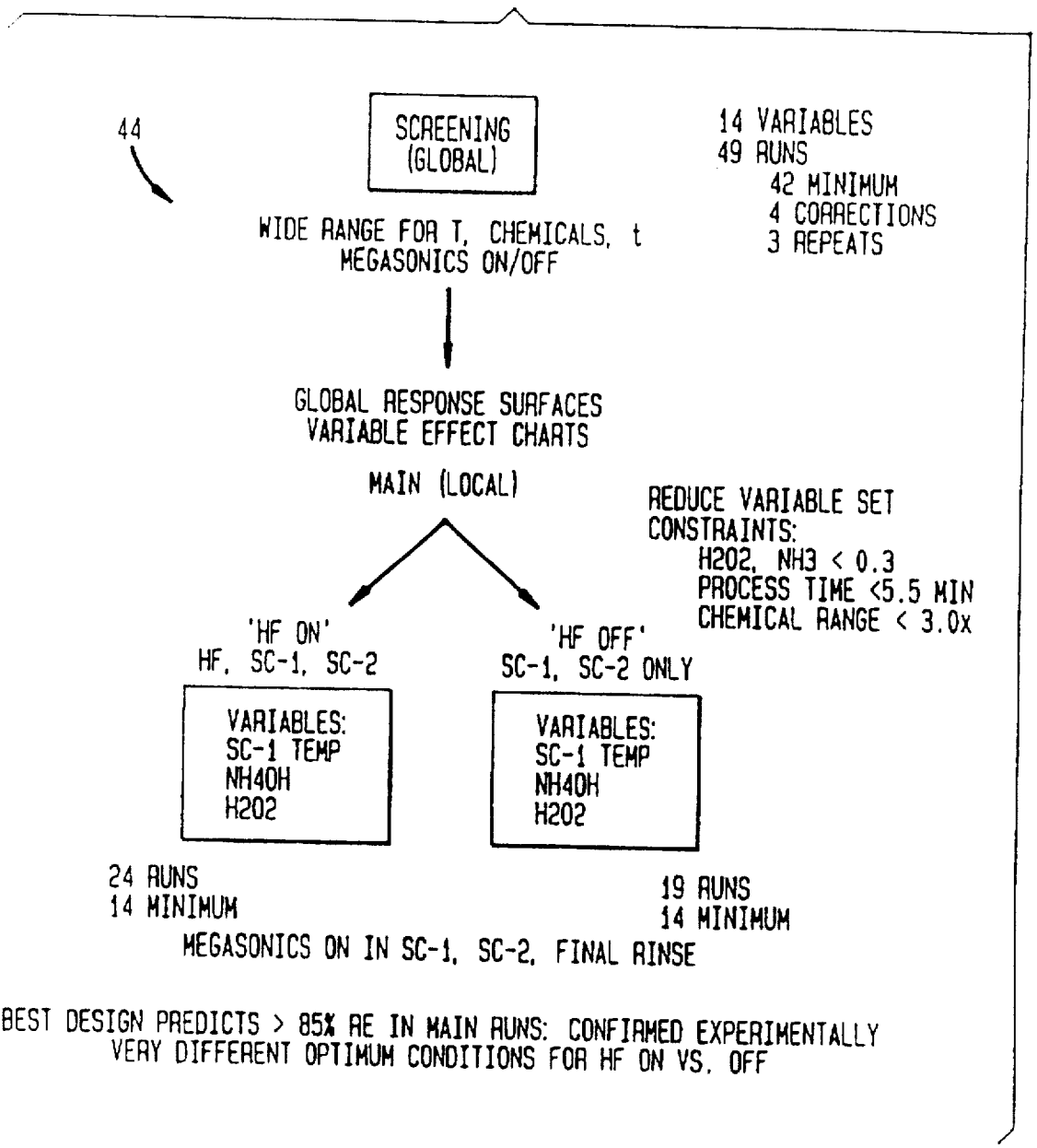
FIG. 14 shows an Outline of Dilute Chemistry Experiments.
Figure 16:
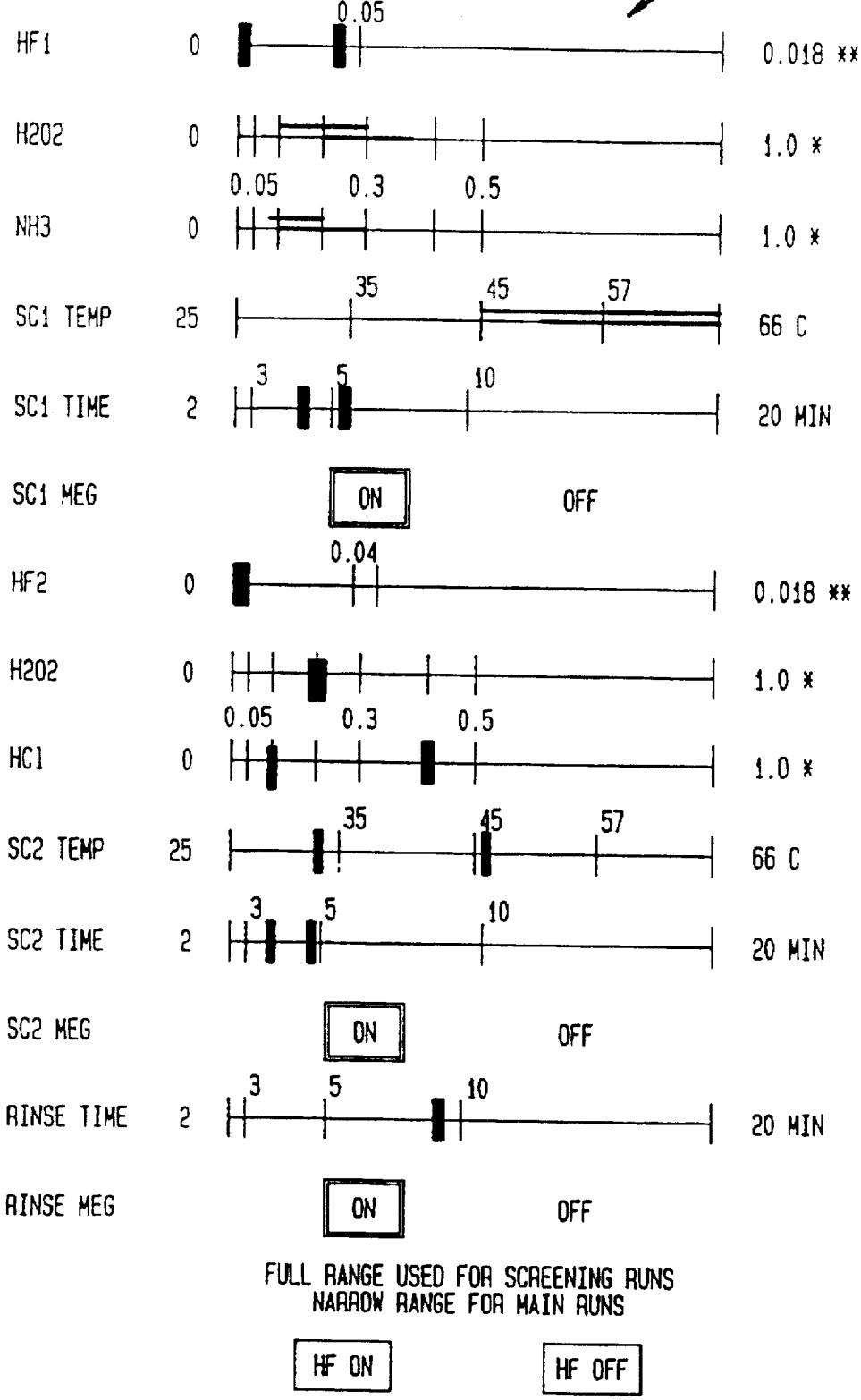
FIG. 16 shows a range of variables for screening and main runs.

The third element summarized above comprises means for optimizing a steady state performance of the physical process based on the composite three objective types, and may be mapped to the FIG. 9 PWO module 32. FIG. 14, supra, provides an example of the third element. The third means effects a solution satisfying simultaneously the three objective types. An illustration of such a solution is illustrated in FIG. 16, numeral 48, comprising a range of variables for screening and main runs.

Machine Realization of the Present Invention

The class of computers known as Von Neumann computers comprise a memory, a bus, zero or more input/output devices, an interactive display unit with GUI (Graphical User Interface), and a central processing unit (CPU) containing an arithmetic/logic unit, a control unit, and a program counter. The program counter may be considered to be part of the control unit. The bus connects the memory, the input/output (I/O) devices, and the control unit and Graphical User Interface (GUI). (See FIG. 17, numeral 50.)

The memory contains storage locations that have addresses. The addresses are usually numerical. Data at each storage location can be read, and, usually, written. Every Von Neumann machine has some memory that can be written, while some of the memory may be read-only.

The bus is able to represent the address of a memory location, the contents of a memory location, and whether the memory location is to be written or read. It may also be able to represent conditions such as changes in the status of I/O devices. The I/O devices are able to receive instructions via the bus, are able to send status information via the bus, and are able to receive data from the bus and write data on the bus when signaled to do so by the bus. The I/O devices may be able to control the bus, but this is not required. Input devices are able to read data stored in the devices of read from external media and place that data on the bus. Output devices are able to write data from the bus to storage in the device or to external media. Some I/O devices are able to do both. In the present invention the user input information may be loaded into the input device.

The central processing unit (or microprocessor) contains an arithmetic/logic unit, a program counter and a control unit (which may also be referred to as an instruction unit). The control unit is what distinguishes Von Neumann computers from calculation.

The central processing unit is able to put address on the bus, read data from the bus, and write data to the bus. In this way, the processing unit is able to cause data to be read from specified memory locations or I/O devices or write data to specified memory locations or I/O devices.

The central processing unit is able to read data from memory locations and treat the data as instructions that control the actions of the control unit and arithmetic/logic unit. At any point in time after the initialization of the computer, the program counter will contain the address of a memory location. In the computer's instruction Cycle, the processing unit will read the instruction stored at the location specified by the program counter, increment the address in the program counter so that it contains the address of the instruction in memory that follows the instruction just read, and execute the instruction just read.

The central processing unit generally has a relatively small amount of storage which can represent the contents of one or more memory locations. This storage is referred to as the register or registers.

The instruction can cause any of the following to happen:
read data from memory or an I/O device into a register;
write data from a register to memory of an I/O device;
performance an arithmetic or logic calculation using data in one or more registers and/or (optionally) memory locations or I/O devices and writing the result to a register or (optionally) memory locations or I/O devices;
cause the contents of the program counter to be changed, optionally storing the previous value in a register or memory.

Whether the contents of the program counter are changed can be based on the result of an arithmetic or logical calculation or based on a value in a register. This allows different sequences of instructions to be executed.

The display and GUI unit allows the user to interact with the BestDesign optimization process, observe the CSH operation in progress, understand and characterize the process as well as change the parameter settings for the optimization process.

This describes the fundamental properties of a Von Neumann computer. Many extensions are possible, for example, there may be instructions that read and write memory in one instruction cycle. There may be multiple buses. The I/O devices may be able to take control of the bus (or Buses) and read or write data from the memory without the processing unit's intervention or assistance. The processing unit may be able to fetch and execute multiple instructions concurrently while providing the abstraction that only one instruction is executed at a time. The computer may provide a virtual memory abstraction, meaning that virtual addresses are mapped to different physical addresses in the memory, allowing programs to use more memory addresses than the computer has in physical memory.

Figure 17:
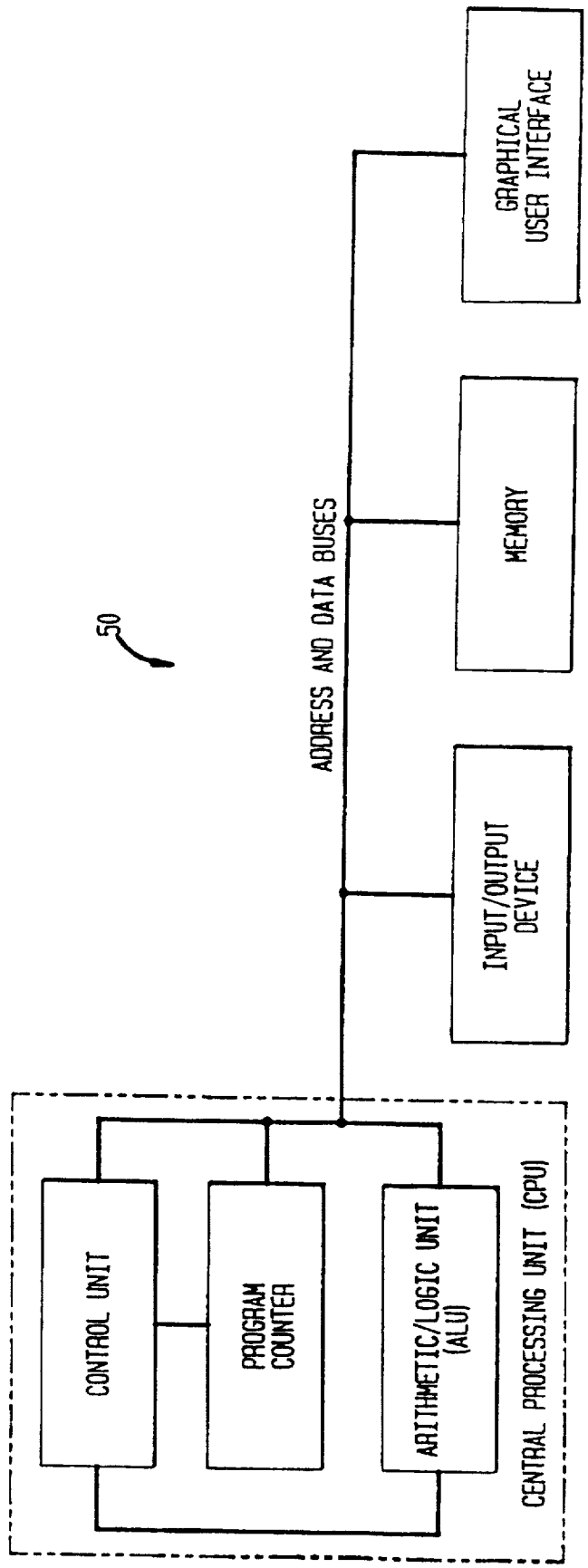
FIG. 17 shows a computer system for machine realization of the present invention.

We now intercalculate elements of the system of the present invention (summarized above) with the FIG. 17 computer 50. Recall that the elements comprise first through fourth means. The first means (Design of Experiment) module, requires action by the memory and CPU. The second means (Response Surface Modelling) requires action by the CPU, as does the third means (Process Window Optimization). The computer display and GUI may be used to image a solution of the type exemplified in FIGS. 1,2,3, 16, supra, and allows the user to interact and understand the optimization process, as well as the physical process being optimized.

What is claimed:

1. A computer performed process for optimizing a steady-state performance of a physical process having multiple inputs and multiple output-responses, the method comprising the steps of:

1) inputting to the computer a mathematical model of the physical process or input data values to build a mathematical model of the physical process;

2) specifying three types of objectives wherein:
  (i) objective Type I comprises finding inputs that enable the responses of the physical process to satisfy a set of constraints;
  (ii) objective Type II comprises finding inputs such that the yield of the physical process is maximized, with yield being the probability of satisfying the constraints on multiple responses given random variations of inputs;

(iii) objective Type III comprises finding inputs such that multiple mutually conflicting objectives are satisfied; and 3) generating an optimized solution satisfying simultaneously all three types of objectives;

4) modifying the steady state performance of a physical process by applying the optimized solution in step 3 to the physical process.

2. A method according to claim 1, comprising generating a set of control points in an operating space representing a random set of conditions of the process.

3. A method according to claim 2, comprising driving the set of control points to a first region in the operating space satisfying objective Type I.

4. A method according to claim 3, comprising driving the control points in the first region to a subsumed second region in the operating space satisfying simultaneously objective Type I and objective Type II.

5. A method according to claim 4, comprising driving the control points in the second region in the operating space to a subsumed third region in the operating space satisfying simultaneously objective Type I and objective Type II and objective Type III.

6. A method according to claim 5, comprising driving the control points by a constraint satisfaction herding operator.

7. A system for optimization of a physical process, the system comprising:

1) means for specifying a sequence of experiments on the physical process;

2) means for creating a mathematical representation of the physical process;

3) specification means for specifying three objectives, wherein:
   (i) objective Type I comprises finding inputs that enable the responses of the physical process to satisfy a set of constraints;
   (ii) objective Type II comprises finding inputs such that the yield of the physical process is maximized, with yield being the probability of satisfying the constraints on multiple responses given random variations of inputs;
   (iii) objective Type III comprises finding inputs such that multiple mutually conflicting objectives are satisfied; and 4) generation means for generating an optimal solution;

5) control means for modifying a steady state performance of the physical process by utilizing the optimal solution generated in step 4;

6) display means for using the mathematical representation of the physical process for generating a solution satisfying simultaneously all three types of objectives.

* * * * *